Figure 1:
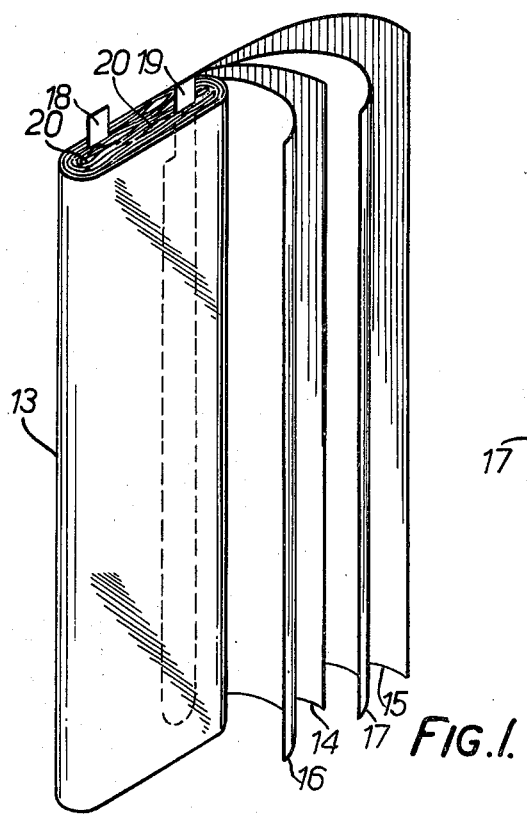

United States Patent [19]
Murfitt et al.

[11] 3,970,904
[45] July 20, 1976

[54] IMPREGNATED CAPACITOR AND METHOD OF MANUFACTURE

[75] Inventors: John Edward Murfitt, Ditchingham, near Bungay; Alastair Martin Pitt, Sudbury, both of England

[73] Assignee: Johnson & Phillips (Capacitors) Limited, England

[22] Filed: June 6, 1974

[21] Appl. No.: 477,319

[30] Foreign Application Priority Data
June 6, 1973 United Kingdom............... 26966/73

[52] U.S. Cl. ............................... 317/258; 29/25.42; 317/260
[51] Int. Cl.² ..................... H01G 4/20; H01G 13/04
[58] Field of Search ........... 317/258, 260; 29/25.42; 242/56.1, 7.03

[56] References Cited
UNITED STATES PATENTS

| | | | |
|---|---|---|---|
| 3,085,183 | 4/1963 | Dokuchitz........................ | 317/258 |
| 3,430,116 | 2/1969 | Johnstone......................... | 317/260 |
| 3,450,968 | 6/1969 | Cox................................... | 317/258 |
| 3,648,339 | 3/1972 | Preissinger...................... | 317/258 |

FOREIGN PATENTS OR APPLICATIONS

| | | | |
|---|---|---|---|
| 106,535 | 9/1937 | Australia........................... | 317/260 |
| 482,279 | 1/1970 | Switzerland..................... | 317/258 |

*Primary Examiner*—E. A. Goldberg
*Attorney, Agent, or Firm*—Brisebois & Kruger

[57] ABSTRACT

A capacitor element is made by interwinding electrode foils and non-porous dielectric films, without interposed paper wicks. The foils and films are wound at different tensions so that transverse passages are formed between adjacent surfaces within the element; when the element is subsequently impregnated with dielectric liquid, those passages facilitate entry of the liquid between the various foils and films and assist proper permeation. The dielectric film and dielectric liquid are preferably polypropylene and mineral oil respectively.

16 Claims, 3 Drawing Figures

U.S. Patent   July 20, 1976   3,970,904

IMPREGNATED CAPACITOR AND METHOD OF MANUFACTURE

This invention relates to capacitors and their manufacture. The invention is particularly concerned with capacitor elements in which the dielectric system is constituted by films of substantially non-porous polymeric material and by a dielectric liquid. Normally, the capacitor electrodes are constituted by metal foils, but they may be formed by a metal layer sprayed or otherwise deposited on films of the same, or different, polymeric material.

Normally, the electrode-forming foils and the dielectric films are interwound under tension on a circular mandrel; after the winding operation has been completed, the wound structures are removed from the mandrel and pressed flat to form a capacitor element. The element, with similar elements is placed in a casing and impregnated with the dielectric liquid which ideally separates adjacent foils and films and permeates the films to fill the interstices of the films.

Attempts to manufacture capacitor elements using non-porous polymeric material alone have not been satisfactory, because of the difficulty of obtaining proper impregnation of the element by the dielectric liquid; the foils and films are wound under substantial tension and the surface to surface contact between adjacent foils and films may prevent the dielectric liquid penetrating into the centre of the element; that is particularly the case where the dielectric liquid is a mineral oil. For that reason, it has been the practice to include between adjacent pairs of non-porous foils and films, sheets of porous material, such as that type of paper known as Kraft paper. The sheets of paper act as "wicks", which enable the dielectric liquid to permeate through the element structure and to reach all parts of the faces of the polymeric films. However, we have found that the use of paper or other "wicks" results in complications in the production of the capacitor, and in particular in the impregnation operation; paper is highly hygroscopic compared with the polymeric film and consequently an extended and high temperature drying operation has to be performed before impregnation proper is commenced.

An object of the present invention is to enable proper impregnation to be achieved when employing films of substantially non-porous dielectric material, and without the use of porous paper or other sheets.

The present invention provides a method of making a capacitor element in which electrode foils and films of substantially non-porous dielectric film are so interwound that the foils and the layers differ in tension to an extent that passages are formed between adjacent surfaces within the element, the passages extending transversely to the lengths of the layers in order to assist entry of impregnating liquid into the layers. The passages enable the dielectric liquid during impregnation to move from the edges of the capacitor element into the centre and extend outwardly from the passages between the films so that proper impregnation is achieved.

Because non-porous polymeric film, and in particular polypropylene has more uniform parameters when manufactured in relatively thin grades, it is preferred to have each layer constituted by a plurality of superimposed films, of which there are at least two different tensions. Thus, each layer may comprise three films, of which two have the same tension and the remaining film or films is at a different tension or tensions. In the latter case, the films at equal tension are preferably overlain or separated by a film at higher tension, so that passage-forming corrugations are formed between the equal tension films.

It is preferred that the passage or passages between successive pairs of foils and films be formed by winding the various foils and films at different tensions. As a consequence, each foil and film is subjected to differing degrees of elongation, with the result that the mean circumference of each film differs sufficiently from its neighbouring foils or films to produce a visible corrugation effect at one or more locations along its length. At each such corrugation, a passage is formed, transverse to the direction of winding.

While it is preferred to have the various films and foils wound at differing tensions the passage or passages may alternatively be formed by drawing off the dielectric films under equal tensions from reels on which the films are wound at different tensions. A reel wound at a high tension, for example, due to its elastic memory, results in the production of a corresponding tension in the capacitor element, regardless of the tension at which the film is wound on the mandrel. The tension at which a reel has been wound is indicated by the hardness factor of the reel, and it has been found that the hardness factor of reels from different manufacturers can vary widely. If then reels of different hardness factor are employed for the various films of the capacitor element, the resulting different tensions in the element produces the above described passage or passages between successive foils and films.

The invention includes a capacitor element comprising electrode foils interwound with separating layers of substantially non-porous dielectric film, the foil and layers being at different tensions, and the film layers consequently having randomly arranged transverse corrugations forming passages between the layers and foils.

Preferably, the tension of the foils and layers are so chosen that the element after winding has a space factor of approximately 3% i.e. the volume of the air space within the element is 3% of the volume of the foils and films making up the element.

While the element may be impregnated with any suitable dielectric liquid that permeates the dielectric material, it is preferred to employ a dielectric oil, and in particular a low viscosity mineral oil having the required permeating properties. The substantialy non-porous dielectric material is preferably polypropylene and the electride foils are preferably metal foils although they may alternatively be films of insulating material sprayed or otherwise coated with metal.

Figure 2:
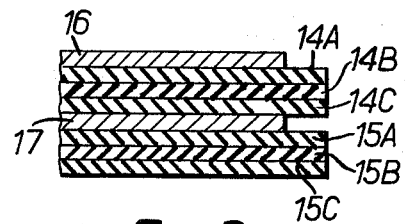
Figure 3:
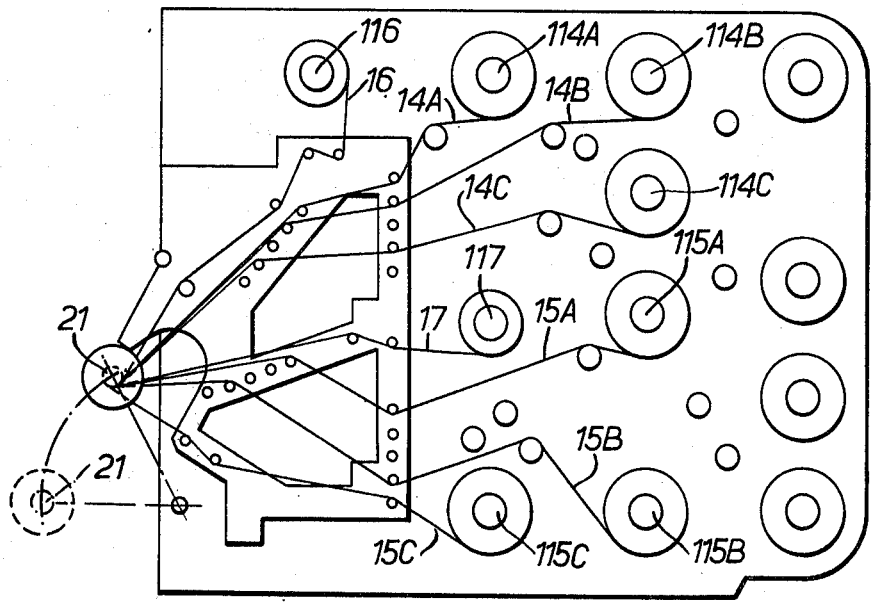

The invention will be more readily understood by way of example from the following description of the manufacture of a capacitor element, reference being made to the drawings accompanying the provisional specification in which FIG. 1 is a perspective view of a capacitor element in partly unwound state, FIG. 2 is a cross-section of part of the element, and FIG. 3 illustrates apparatus for winding a capacitor element.

The capacitor element illustrated and to be described is one designed for high voltage application, but the same principles may be employed in the manufacture of low voltage capacitors.

The capacitor element is shown at 13 in FIG. 1. The element is wound on a mandrel 21 (FIG. 3), so that substantially non-porous dielectric film layers 14, 15 are wound between electrode foils 16 and 17, the electrode foils becoming completely embedded within the dielectric layers 14, 15. The electrode foils 16, 17 are provided with suitable metallic tags 18, 19; alternatively, the electrodes may be of the extended arrangement where each foil is exposed by a small margin from opposite sides of the element winding.

After winding, each element is removed from the winding mandrel 21 and pressed flat, i.e. in the form shown in FIG. 1. A required number of elements 13 are then assembled into a single pack and placed within a capacitor casing.

In the form shown in FIG. 2, each dielectric layer 14, 15 consists of three films of substantially non-porous polymeric dielectric material 14A, 15B, 14C and 15A, 15B, 15C; the material of the films is preferably polypropylene film of electrical grade.

Films 14A, 15A and 14B, 15B and 14C 15C may differ in thickness. Thus, each layer 14, 15 may be 32 microns in thickness, with films 14A, 14B, 15A, 15B each having a thickness of 10 microns and films 14C, 15C each having a thickness of 12 microns. However, in general, the width, number of the polypropylene films and the thickness of the polypropylene films are chosen to suit the required capacitance and voltage rating.

FIG. 3 shows a winding machine arranged to wind on to the mandrel 21 an element of the form shown in FIGS. 1 and 2. The winding machine has a number of spindles for receiving the foil reels and the reels of film. In FIG. 3 the various spindles in use are given the same references, but increased by 100, as the various foils and films carried by the spindles; thus, spindle 114A carries the reel which supplies film 14A. The various foils and films are guided by suitably placed rollers from the various reels to the mandrel 21, which is shown in full line in the winding position and in chain line in the unloading position. Each spindle of the winding machine is braked so that the tension at which the corresponding foil or film is wound on to the mandrel 21 may be selected.

The tensions at which the various foils and films are wound on the mandrel 21 have different values, with the aim of producing an element having a space factor of approximately 3%, i.e. the volume of the air spaces within the element winding is 3% of the volume of the electrode foils and dielectric films making up the element. Because of the differing tensions of the various films, the films on the mandrel are subject to different degrees of elongation, with the result that the mean circumference of each film differs sufficiently from that of each of the adjacent foil or film to produce a visible corrugation effect in each film of the winding, both on the winding mandrel and also when formed into a flattened element as shown in FIG. 1. The tension in each film may be varied between zero and the elastic limit of the material consistent with a. the absence of longitudinal creasing of the foil electrodes and dielectric films, b. the absence of overrun of the reels when the winding machine is stopped, and c. the total tension applied to the winding mandrel being limited to a value less than that at which slipping of the element on the mandrel and slipping between adjacent turns occur.

As an example, the following figures are given for the tensions in Newtons per meter width (N/m) at which the various electrode foils and polypropylene films of FIG. 2 may be wound:-

|  | Tension |
| --- | --- |
| Electrode foil 16 | 140:N/m |
| Film 14A | 6.4:N/m |
| Film 14B | 6.4:N/m |
| Film 14C | 380:N/m |
| Electrode foil | 140:N/m |
| Film 15A | 6.4:N/m |
| Film 15B | 6.4:N/m |
| Film 15C | 380:N/m |

The corrugating of the various films produces a passage or passages between each pair of adjacent foils and films, the passage or passages extending tranversely to the length of the films; some of the passages are indicated at 20 in FIG. 1.

Although the adjacent films 14A and 14B are wound at the same tension, passages are produced between those films because the greater tension on film 14C causes the inner films to be corrugated or crumpled at different locations in each turn. The same phenomenon occurs in the films 15A and 15B which also have equal tension. It is not of course essential to have any adjacent films wound at equal tension and the foil 16 and films 14A - 14C may all be wound at different tensions, as may the foil 17 and films 15A - 15C.

While it is preferred to form the passages between adjacent films by winding under differential tensions as described, the foils and films may be wound under constant tension, provided that the films are drawn off reels of polypropylene of differing hardness factors. Polypropylene film as supplied by the manufacturers have been found to have unwind characteristics which vary substantially from manufacturer to manufacturer, and even from reel to reel of the same manufacturer. If then, the polypropylene for the various films are drawn at equal tension off reels having differing hardness factors, the films on the element, due to the elastic memory of the material, reach different tension values, regardless of the tension at which the films are wound on to the mandrel and result in the same corrugation and passage formation as described. However, because the manufacturers of polypropylene do not normally supply reels with consistent hardness factors, the use of reels in this way is at present difficult, if not impractical.

Again, the various films may be both wound on to the mandrel at different tensions and supplied from reels of differing hardness factors.

After each element is formed, it is overwrapped by a number of finishing turns of one polypropylene film and flattened as described. A number of the elements are strapped together to form a pack of series connected groups of parallel connected elements arranged to suit the required voltage, pressure being applied to the pack to give it predetermined dimensions, whilst maintaining the space factor inside the elements. It has been found that more uniform impregnation is obtained if the pack is pressed to constant dimensions in this way, rather than under a constant pressure, which may cause differences in the sizes of the passages, from pack to pack. The electrode foils are connected together so that adjacent electrode foils in contiguous elements have the same polarity; there is then no electric stress in use between the outer finishing turns of adjacent elements, and consequently any incomplete impregnation between those turns has no deleterious effect.

The pack of elements is then loaded into a capacitor casing and assembly of connection terminals and lid is completed after which it is placed in an impregnating tank subjected to vacuum and filled with degassed mineral oil. Vacuum is released and a soak period is allowed at atmospheric pressure after which the vessel is pressurised using an inert gas, such as nitrogen, at super atmospheric pressure to accelerate complete impregnation of the elements.

During impregnation, the impregnating liquid, which is preferably a mineral oil but which may be any suitable liquid which permeates the polypropylene film, penetrates the element from the edges, through the passages 20 and into the interior of the element. Thereby the degree and rate of penetration of the dielectric liquid into the interstices of the element winding is enhanced, the liquid passing outwardly from each passage by capillary action to wet all parts of the films, and thereafter to permeate into the structure of the film itself.

By the described techniques of winding, it is possible to make capacitor elements using polypropylene for the foils and mineral oil as the impregnating/permeating dielectric liquid, and to obtain proper impregnation without the use of paper wicks. Although the resulting elements have advantages over existing capacitors in manufacture and use, a capacitor made with those elements has electrical properties comparable with those of existing capacitors.

We claim:

1. In a method of making a capacitor element comprising the steps of
   a. interwinding electrode foils and layers of substantially non-porous dielectric film, to form a winding, and
   b. impregnating said winding with a dielectric liquid, the improvement according to which said foils and said layers in said winding are interwound under conditions such that the foils and films of said winding are at sufficiently different tensions that at least one of each pair of adjacent foil and film surfaces is corrugated during winding to form passages extending transversely to the lengths of said layers between said adjacent surfaces, which passages assist entry of said impregnating liquid between said foils and said layers.

2. A method according to claim 1, in which each layer is constituted by a plurality of films, of which there are at least two at different tensions.

3. A method according to claim 2, in which each layer comprises at least three films, of which at least two have the same tension.

4. A method according to claim 3, in which the films of equal tension are adjacent one another, and are overlain by a film or foil at a higher tension, so that passage-forming corrugations are formed between those two films.

5. A method according to claim 2, in which the foils and films are wound at the differing tensions.

6. A method according to claim 2, in which the films are wound at substantially the same tension from reels on at least two of which the films are pretensioned at different values.

7. A method according to claim 1 in which, the winding prior to impregnation is so clamped that it has predetermined dimensions.

8. A method according to claim 1, in which the film is polypropylene.

9. A method according to claim 1, in which said dielectric liquid is an impregnating oil.

10. A capacitor element comprising electrode foils interwound with separating layers of substantially non-porous dielectric film, the foil and layers being at different elongations and the film layers consequently having randomly arranged transverse corrugations forming passages between the layers and foils, and each layer consisting of a plurality of films, of which there are at least two at different elongations.

11. A capacitor element according to claim 10, in which the element has a space factor of 3%.

12. A capacitor element according to claim 10, in which each layer comprises at least three films, of which at least two have the same elongation.

13. A capacitor element according to claim 10, in which the film is polypropylene.

14. A method of making a capacitor, comprising the steps of
   a. forming at least one capacitor element winding by interwinding at differing tensions electrode foils and layers of substantially non-porous dielectric film, and thereby forming passages extending transversely to the lengths of said layers between adjacent foil and dielectric layer surfaces within said winding,
   b. placing said at least one capacitor element winding within an impregnation tank,
   c. subjecting the interior of said tank to an inert gas at super-atmospheric pressure, and
   d. introducing an impregnating dielectric liquid to said tank to impregnate said at least one winding, entry of said liquid into said winding being assisted by said passages.

15. A method of making a capacitor, comprising the steps of
   a. forming at least one capacitor element winding by interwinding at substantially the same tension electrode foils and substantially non-porous dielectric films from reels of said foils and films, on at least two of said reels said films being pretensioned at different values, and thereby forming passages extending transversely to the lengths of said foils between adjacent foil and film surfaces within said winding,
   b. placing said at least one capacitor element winding within an impregnation tank,
   c. subjecting the interior of said tank to an inert gas at super-atmospheric pressure, and
   d. introducing an impregnating dielectric liquid to said tank to impregnate said at least one winding, entry of said liquid into said winding being assisted by said passages.

16. A method of making a capacitor according to claim 14, in which a number of said capacitor element windings are placed in juxtaposition within a capacitor casing with the outer foils of contiguous windings having the same polarity, and said capacitor casing is placed within said impregnation tank.

* * * * *